United States Patent
Menet

(10) Patent No.: US 8,905,062 B2
(45) Date of Patent: Dec. 9, 2014

(54) METHOD AND DEVICE FOR DETECTING THE FLOW OF A LIQUID

(75) Inventor: Georges Menet, Saint André (FR)

(73) Assignee: Watts Industries France, Vedene (FR)

( * ) Notice: Subject to any disclaimer, the term of this patent is extended or adjusted under 35 U.S.C. 154(b) by 759 days.

(21) Appl. No.: 13/130,025

(22) PCT Filed: Nov. 23, 2009

(86) PCT No.: PCT/FR2009/052262
§ 371 (c)(1),
(2), (4) Date: Aug. 19, 2011

(87) PCT Pub. No.: WO2010/058141
PCT Pub. Date: May 27, 2010

(65) Prior Publication Data
US 2012/0024393 A1   Feb. 2, 2012

(30) Foreign Application Priority Data
Nov. 24, 2008 (FR) ...................... 08 57950

(51) Int. Cl.
*F17D 5/06* (2006.01)
*G01M 3/28* (2006.01)

(52) U.S. Cl.
CPC ............... *G01M 3/2815* (2013.01); *F17D 5/06* (2013.01)
USPC .............. 137/487; 137/487.5; 137/624.12; 137/613; 340/605; 73/40.5 R

(58) Field of Classification Search
CPC .............................. F17D 5/06; G01M 3/2815
USPC .......... 137/485–487.5, 624.12, 613; 340/605; 73/40, 40.5 R
See application file for complete search history.

(56) References Cited

U.S. PATENT DOCUMENTS

| | | | |
|---|---|---|---|
| 4,735,231 A | 4/1988 | Jacquet |
| 5,377,529 A | 1/1995 | Boyd |

(Continued)

FOREIGN PATENT DOCUMENTS

| | | |
|---|---|---|
| DE | 102006036518 A1 | 2/2008 |
| EP | 1517128 A2 | 3/2005 |
| FR | 2694087 A1 | 1/1994 |

OTHER PUBLICATIONS

Form PCT/ISA/210, Mar. 19, 2010, ISR for PCT/FR2009/055562.

(Continued)

*Primary Examiner* — Eric Keasel
(74) *Attorney, Agent, or Firm* — Edwards Wildman Palmer LLP; Steven M. Jensen

(57) ABSTRACT

Method and device for detecting the flow of liquid, in particular water, in a consuming installation, comprising at least one opening/closing means (3) for supplying liquid, this installation being supplied via an inlet pipe (2) fitted with a solenoid valve (5), a pressure sensor (6) upstream of the solenoid valve and a pressure sensor (7) downstream of the solenoid valve. Management means (8) are able to effect the following operations: calculation of the difference (ΔP) between the value of the upstream pressure signal (Pam) and the value of the downstream pressure signal (Pav); comparison of this difference (ΔP) with at least one triggering threshold (SΔPo, SΔPf); when the pressure difference (ΔP) reaches or exceeds a triggering threshold (SΔPo), a command signal (Co) to open the solenoid valve (5) is generated; when the pressure difference (ΔP) reaches or falls below a triggering threshold (SΔPf), a command signal (Cf) to close the solenoid valve (5) is generated; and a flow signal (D) is generated as a function of said pressure difference (ΔP).

7 Claims, 3 Drawing Sheets

(56) References Cited

U.S. PATENT DOCUMENTS

| | | | |
|---|---|---|---|
| 5,971,011 A * | 10/1999 | Price | 137/487.5 |
| 5,979,493 A * | 11/1999 | Simpkins, Jr. | 137/487.5 |
| 6,543,479 B2 * | 4/2003 | Coffey et al. | 137/624.11 |
| 6,963,808 B1 | 11/2005 | Addink et al. | |
| 2002/0148515 A1 | 10/2002 | Coffey et al. | |
| 2005/0224118 A1 | 10/2005 | Tornay | |
| 2008/0266125 A1 | 10/2008 | Windisch et al. | |

OTHER PUBLICATIONS

EPO Form 1503, Jul. 9, 2009, French Search Report for PCT/FR2009/052262.

* cited by examiner

METHOD AND DEVICE FOR DETECTING THE FLOW OF A LIQUID

This application is the U.S. national phase, to 35 U.S.C. §371, of PCT international application Ser. No. PCT/FR2009/052262, filed Nov. 23, 2009, designating the United States and published in French on May 27, 2010 as publication WO 2010/058141 A1, which claims priority to French application Ser. No. 0857950, filed Nov. 24, 2008. The entire contents of the aforementioned patent applications are Incorpated herein by this reference.

This invention concerns the domain of liquid-consuming installations, such as installations for distributing sanitary water in dwellings or in the distribution networks to dwellings.

In such installations, it is common for water consumption to significantly exceed user requirements as a result of leaks or micro-leaks caused by general, imperceptible deterioration of pipes, joints and faucets. Such water losses generate monetary losses both upstream, on account of the unnecessary treatment of the water lost, and downstream for users of the installations.

The document U.S. Pat. No. 4,735,231 describes a flow detection device that uses a solenoid valve, in which the signals generated by a single pressure sensor downstream of the solenoid valve are sent to an electronic circuit that includes a plurality of chronometers triggered selectively to determine, according to a program, the existence of major leaks or minor leaks.

The document US 2002/0148515 describes a solenoid valve that includes mechanical organs that are able to move as a function of leaks, such movements being moreover detected to determine the existence of such leaks.

This invention is intended to monitor the flow conditions in installations in order for example to be able to determine whether there are flows corresponding to leaks or micro-leaks, without thereby interfering with flows serving user requirements.

This invention concerns a method for detecting the flow of liquid, in particular water, in a consuming installation, comprising at least one opening/closing means for supplying liquid, this installation being supplied via an inlet pipe fitted with a solenoid valve, a pressure sensor upstream of the solenoid valve that is able to issue an upstream pressure signal (Pam) and a pressure sensor downstream of the solenoid valve that is able to issue a downstream pressure signal.

The method may include the calculation of the difference between the value of the upstream pressure signal (Pam) and the value of the downstream pressure signal and the comparison of this difference with at least one triggering threshold.

The method may be such that when the pressure difference reaches or exceeds a triggering threshold, a command signal to open the solenoid valve is generated; when the pressure difference reaches or falls below a triggering threshold, a command signal to close the solenoid valve is generated, and a flow signal is generated as a function of said pressure difference.

The flow signal may be generated as a function of the command signal to open and the command signal to close the solenoid valve.

When the pressure difference reaches or exceeds a triggering threshold, said command signal to open the solenoid valve may be issued immediately.

When the pressure difference reaches or falls below a triggering threshold, a signal to close the solenoid valve may be generated and said command signal to close the solenoid valve may be deferred by a predetermined timer delay in relation to this closing signal.

The value of the triggering threshold generating the opening signal may be greater than the value of the triggering threshold generating the closing signal.

The flow signal generated may be the duration separating a command signal to close and a consecutive command signal to open the solenoid valve.

This invention also concerns a method for detecting the flow of liquid, in particular water, in a consuming installation, comprising at least one opening/closing means for supplying liquid, this installation being supplied via an inlet pipe fitted with a solenoid valve generating a pressure drop, a pressure sensor upstream of the solenoid valve that is able to issue an upstream pressure signal and a pressure sensor downstream of the solenoid valve that is able to issue a downstream pressure signal.

The method may include the calculation of the difference between the value of the upstream pressure signal and the value of the downstream pressure signal, and the comparison of this difference with at least one triggering threshold.

The method may be such that when the pressure difference reaches or exceeds a triggering threshold, a signal to open the solenoid valve is generated and a command signal to open the solenoid valve is issued immediately, when the pressure difference reaches or falls below a triggering threshold, a signal to close the solenoid valve is generated and a command signal to close the solenoid valve is issued after a timer delay, and when the time between a closing signal and a consecutive opening signal is less than a predetermined time, a flow signal is generated.

The value of the triggering threshold generating the opening signal may be greater than the value of the triggering threshold generating the closing signal.

The times between respectively the command signals to close and the consecutive command signals to open the solenoid valve may be memorized.

The times memorized may be compared and if a predetermined number of successive times is approximately equal, an alarm signal is issued.

When an opening command signal is not followed by a closing command signal within a predetermined safety time, a safety command signal to close the solenoid valve may be issued.

This invention also concerns a device for detecting the flow of liquid, in particular water, in a consuming installation comprising at least one opening/closing means to supply the liquid that is supplied by an input pipe.

The device may include a solenoid valve generating a pressure drop, a pressure sensor fitted upstream of the solenoid valve that is able to issue an upstream pressure signal, a pressure sensor fitted downstream of the solenoid valve that is able to issue a downstream pressure signal, and management means able to command the solenoid valve between a closed state and an open state as a function of the difference between the value of the upstream pressure signal and the value of the downstream pressure signal that are able to issue a flow signal as a function of said difference.

This invention can be better understood by studying the water consuming installation and its operating method, described by way of non-limiting examples and illustrated by the drawing in which.

Figure 1:
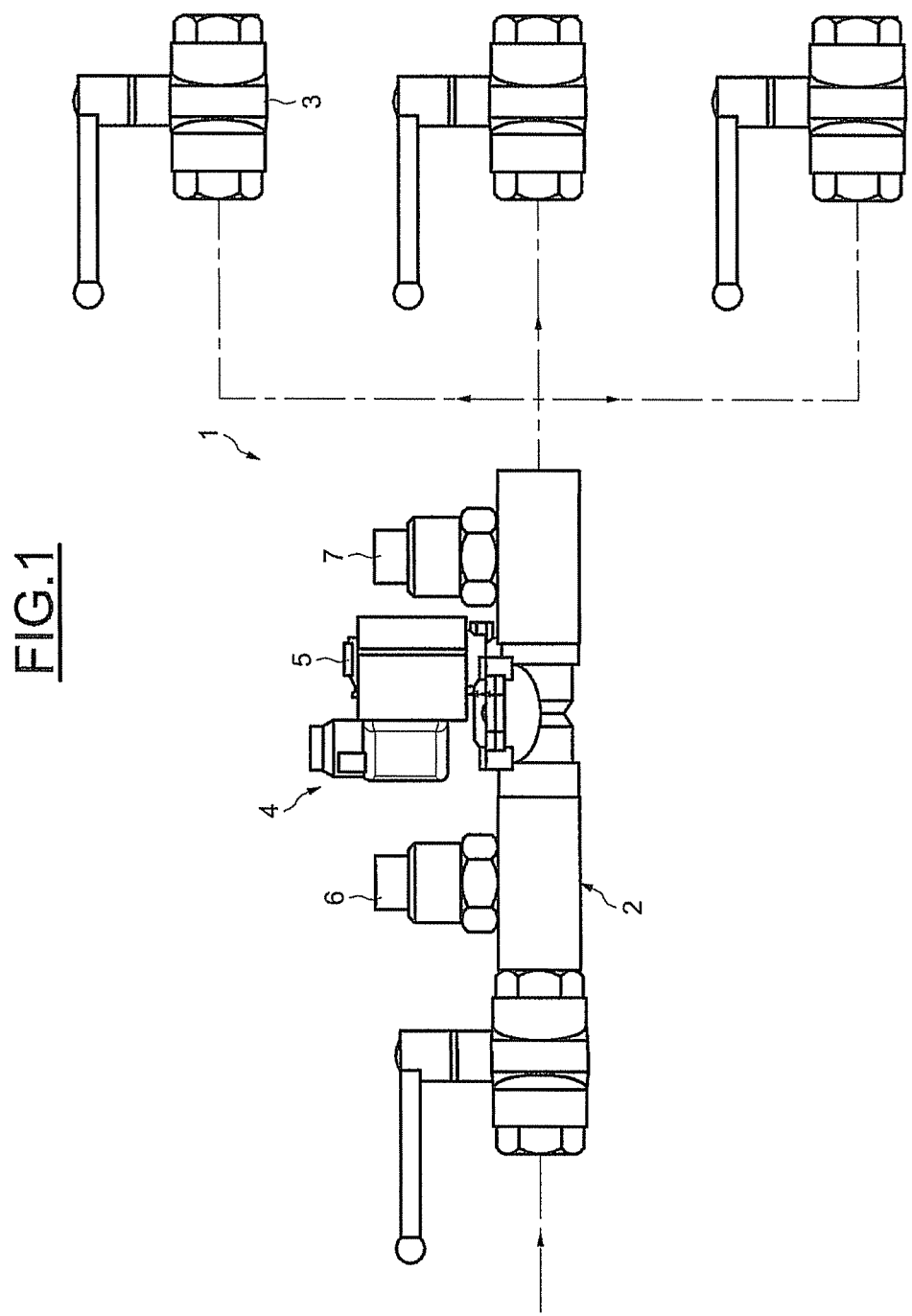
FIG. 1 represents a diagram of an installation fitted with a flow detection device.

FIG. 1 shows an installation 1 that consumes a liquid, such as water, comprising an input pipe 2 and manual or controlled opening/closing means, enabling water from the input pipe 2 to be drawn as required by the user. The opening/closing means are for example faucets 3.

The input pipe 2 is fitted with a flow detection device 4 that is able to directly or indirectly identify different types of flow of the liquid in the consuming installation 2, in order, in particular, to detect micro-leaks of liquid caused for example by a deterioration of this installation, in relation to an intentional demand.

The flow detection device 4 includes, fitted to the input pipe 1, a solenoid valve 5, a pressure sensor 6 fitted upstream of the solenoid valve 5, that is able to issue an upstream pressure signal Pam, and a pressure sensor 7 fitted downstream of the solenoid valve 5, that is able to issue a downstream pressure signal Pav.

The solenoid valve 5 is chosen so as to generate a pressure drop such that, when the liquid is flowing, the value of the downstream pressure signal Pam is less than the value of the upstream pressure signal Pam.

Figure 2:
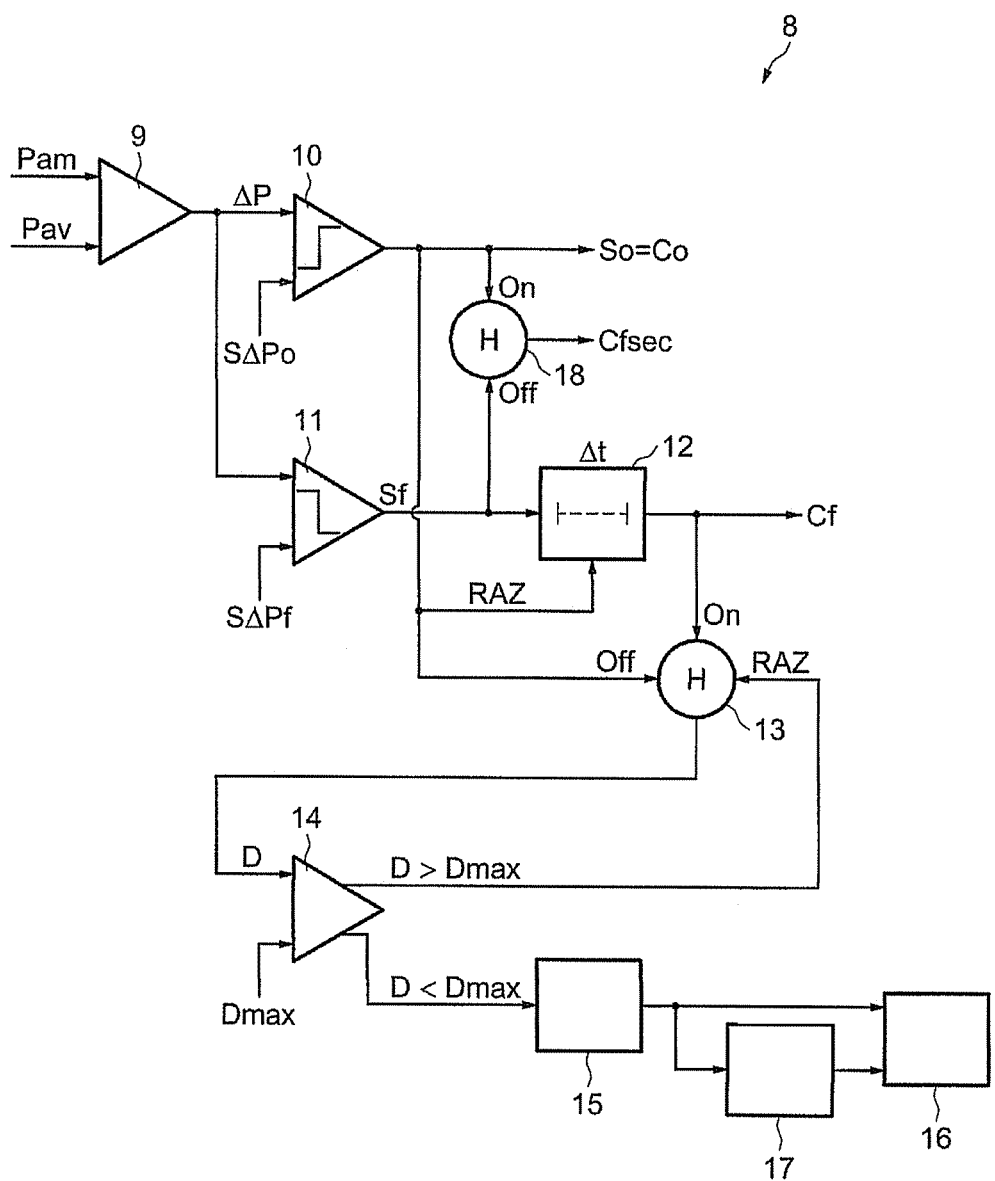
FIG. 2 represents an electronic diagram of the flow detection device.

As shown in FIG. 2, the flow detection device 4 also includes an electronic circuit 8 that can process the Pam and Pav signals issued by the pressure sensors 6 and 7 and issue command signals for the solenoid valve 6 and flow detection signals such as for micro-leaks or major leaks.

The electronic circuit 8 includes a comparator 9 that issues a signal ΔP corresponding to the difference between the value of the upstream pressure signal Pam and the value of the downstream pressure signal Pav.

The electronic circuit 8 includes a comparator 10 that receives the signal ΔP and that issues a signal So to open the solenoid valve 5 when this signal ΔP exceeds a predetermined opening triggering threshold SΔPo. This signal So constitutes a command signal Co directly sent to the solenoid valve 5 to switch its state to open. In an alternative embodiment, the command signal Co could be offset in relation to the signal Sf.

The electronic circuit 8 includes a comparator 11 that also receives the signal ΔP and that issues a signal Sf to close the solenoid valve 5 when this signal ΔP falls below a predetermined closing triggering threshold SΔPf.

The predetermined closing triggering threshold SΔPf is preferably lower than the predetermined opening triggering threshold SΔPo.

The electronic circuit 8 includes a timer 12 that receives the signal Sf and that issues a command signal Cf offset by a predetermined timer duration Δt. This command signal Cf is sent to the solenoid valve 5 to switch its state to closed and to keep it in that state.

The flow detection device 4 is able to operate as described below.

Case 1: The faucets 3 are closed (no water demanded) and the installation 1 has no leaks or micro-leaks.

The solenoid valve 5 is in a closed state (OFF). The value of the upstream pressure signal Pam and the value of the downstream pressure signal Pav are equal or in equilibrium such that the signal ΔP is zero. Nothing happens.

Case 2: A user draws water intentionally.

Figure 3:
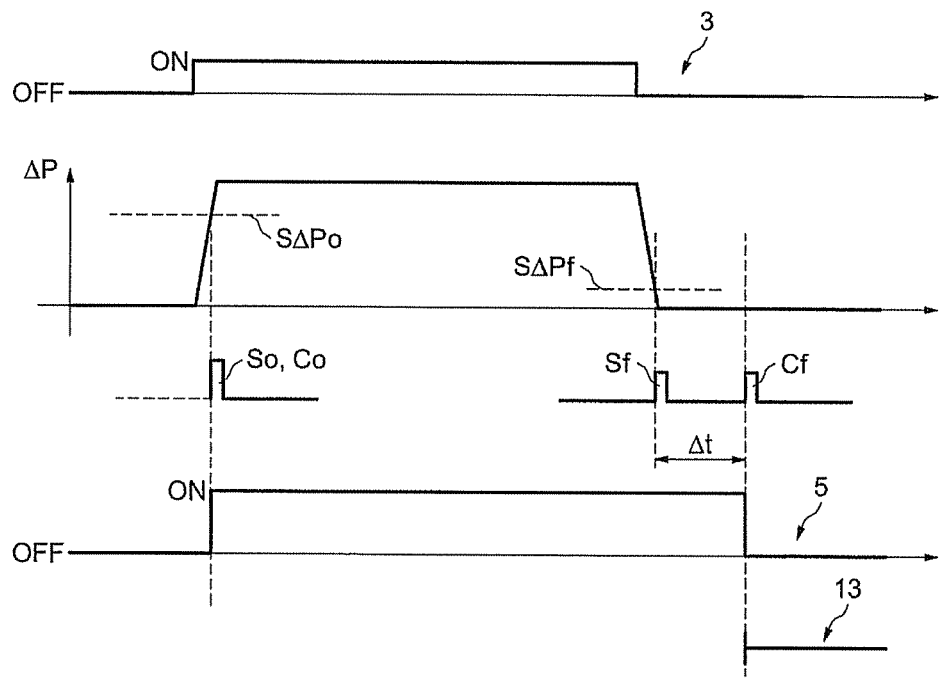
FIG. 3 represents a diagram of an operating method of the flow detection device.

This case is illustrated in FIG. 3.

The solenoid valve 5 is in a closed state (OFF).

When a user opens any one of the faucets 3, the value of the downstream pressure signal Pav drops in relation to the value of the upstream pressure signal Pam. If the value of the signal ΔP reaches or exceeds the opening triggering threshold SΔPo, the comparator 10 issues the command signal Co which is sent to the solenoid valve 5 to switch it immediately to an open state (ON) and supply the water.

As long as the water is being drawn intentionally, i.e. as long as the value of the signal ΔP is below the closing triggering threshold SΔPf, on account of the intrinsic pressure drop of the solenoid valve 5, this latter remains in an open state and the water is supplied.

When the user closes the faucet 3 (water no longer being drawn intentionally), the value of the downstream pressure signal Pav rises in relation to the value of the upstream pressure signal Pam. When the value of the signal ΔP drops below the closing triggering threshold SΔPf, the comparator 11 issues the signal Sf to the timer 12.

If no water is demanded during the timer delay Δt, the timer 12 sends, at the end of the timer delay Δt, a command signal Cf to the solenoid valve 5 to switch it to a closed state (OFF).

If water is drawn during the timer delay Δt, the value of the pressure difference signal ΔP rises above the opening triggering threshold SΔPo. The solenoid valve 5 remains in an open state (ON) to enable the water to be drawn and the comparator 10 sends a reset signal for the timer 12. The timer delay Δt makes it possible to prevent successive openings/closures of the solenoid valve 5 for relatively close water demands, occurring within this time.

Case 3: The faucets 3 are closed (no water demanded) but the installation 1 has a leak or a micro-leak.

Figure 4:
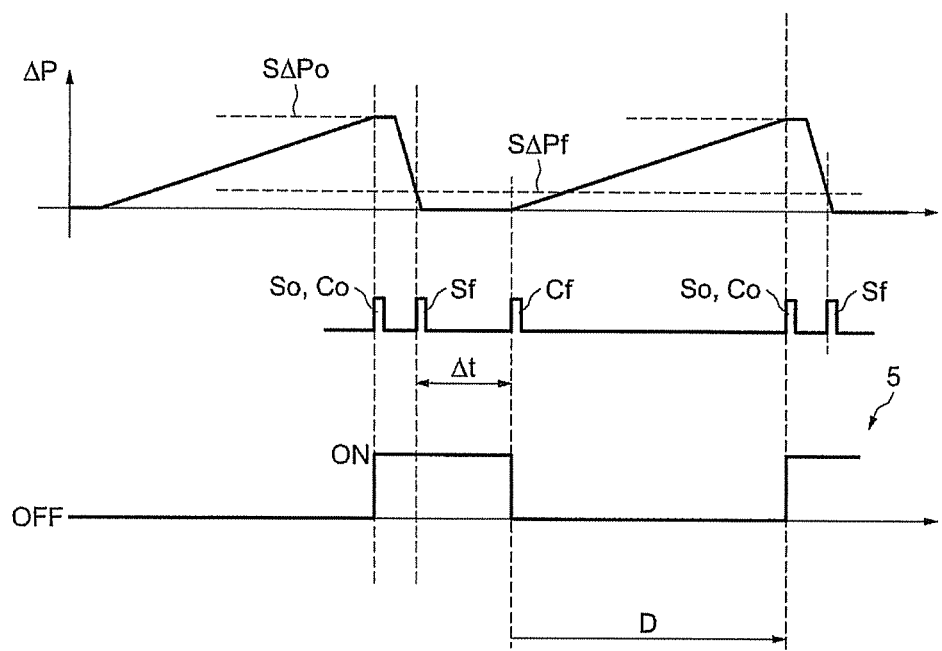
FIG. 4 represents a diagram of another operating method of the flow detection device.

This case is illustrated in FIG. 4.

The solenoid valve 5 is in a closed state (OFF).

Under the effect of a leak or a micro-leak, the value of the downstream pressure signal Pav drops progressively in relation to the value of the upstream pressure signal Pam. If the value of the pressure difference signal ΔP reaches or exceeds the opening triggering threshold SΔPo, the comparator 10 issues the command signal Co which is sent to the solenoid valve 5 to switch it immediately to an open state (ON).

As the faucets 3 are closed, the value of the downstream pressure signal Pav rises in relation to the value of the upstream pressure signal Pam. When the value of the pressure difference signal ΔP drops below the closing triggering threshold SΔPf, the comparator 11 issues the signal Sf to the timer 12. At the end of the timer delay Δt, the timer 12 sends a command signal Cf to the solenoid valve 5 to switch it to a closed state (OFF).

As the micro-leak is by its nature always present, the above cycle is repeated.

If at any moment in the successive cycle or cycles above water is demanded by opening a faucet 3, the cycle underway is stopped and the flow detection device 4 comes into operation in accordance with case 2 described above. A new cycle is started with the future command signal to close the solenoid valve 5.

As the rate of a leak or of a micro-leak is normally considerably less than the normal supply rates, they do not disturb the operation described in case 2. They do not really have a reducing effect on the downstream pressure Pav unless the solenoid valve 5 is closed.

The electronic circuit 8 also includes a chronometer 13 which is started by the command signal Cf to close the solenoid valve 5, issued by the timer 12, and which is stopped by the command signal Co to open the solenoid valve 5. The chronometer 13 then supplies the duration values D that separate the switching to a closed state and the consecutive switching to an open state (ON) of the solenoid valve 5.

The duration values D are sent to a comparator 14 subject to a reference duration value Dmax.

When a duration value D is greater than the reference duration value Dmax, a reset signal is sent to the chronometer 13. This means that no water has been intentionally demanded during that duration D and that there are no micro-leaks that can be qualified as such.

When a duration value D is lower than the reference duration value Dmax, it means that there is a flow through the solenoid valve 5, as a result of water being drawn intentionally and/or micro-leaks. This duration value D is recorded in a comparison register 15 as the value Dn.

The register 15 is able to compare the duration values Dn memorized.

If the duration values Dn are very variable, this usually means that it relates to intentional demands for water.

If on the other hand the register 15 detects a number n of successive duration values Dn that are not equal or that have a predetermined difference between them, more specifically a predetermined small difference, it means that n cycles of case 3 described above have occurred successively and that it relates to a leak or a micro-leak. The register 15 then issues an alarm signal Sa over a signaling means 16 in a suitable form, for example on a screen and/or in the form of a beep. For example, the register 15 is a shift register that only keeps in the memory the last n successive duration values Dn.

It can be seen that leaks and micro-leaks cannot be detected while the solenoid valve 5 is opened or remains open in accordance with case 2 described above.

The electronic circuit 8 may also include a processor 17.

Knowing the flow characteristics of the solenoid valve 5 and having n successive duration values D, the processor 17 can calculate the rate of the leak or of the micro-leak and send this value over for example the signaling means 16. Knowing the rate of the leak or of the micro-leak and the programmed price of the water, the processor 17 can also calculate the cost of the water lost, for example as a daily or monthly monetary value.

The electronic circuit 8 may also include a chronometer or timer 18 started by the signal So (Co) and reset by the signal Sf (or the signal Cf). If the signal Sf (or the signal Cf) is not sent to the chronometer 18 at the end of a safety period Dsec, which is greater than the duration Dmax, the chronometer 18 sends a safety signal Sfsec to the solenoid valve 5 to trigger its definitive closure. This means that there is a significant and long-term leak, resulting for example from a faucet 3 left open by a user or a significant deterioration of the installation 1. This closed safety state is then sent to the signaling means 16 in a suitable form. An intervention is then required to bring the detection device 4 back into normal operation.

The foregoing establishes that operation of the detection device 4 may be dependent on the differences between the pressure values Pam and Pav but independent of their actual values which may vary over time. Nonetheless, in an alternative embodiment, the value of the upstream pressure Pam could be fixed, such that the upstream pressure sensor could be removed. The value of the upstream pressure Pam could then be a reference value supplied to the comparator 9.

The solenoid valve 5 can be set to be normally open, normally closed or bistable.

According to a non-limiting sample embodiment, the following values may be adopted.

The value of the timer signal $\Delta t$ could be between 0.1 and 15 minutes.

The value of the reference duration Dmax could go to at least 10 seconds.

The value of the safety duration Dsec can be between 15 minutes and 3 hours.

The number n of successive duration values Dn that are equal or that have a predetermined difference between them, triggering an alarm signal, may be between 5 and 50.

The difference between the successive duration values Dn resulting in an alarm signal could go to at least 15%.

The flow detection device 4 may then be able to detect micro-leaks from several drops per minute.

The flow detection device 4 may also be fitted with means, for example a button, to provisionally suspend flow control, intentionally switching the solenoid valve 5 to an open state, in order for example to satisfy a prolonged demand for water. Flow control as described above could be restarted preferably automatically at the end of a predetermined period, for example a long period, or under the effect of specific means, for example a button.

The installation 1 could also be fitted with a bypass pipe able to short-circuit the solenoid valve 5, it being possible to fit this bypass with a manual valve in order to supply the faucets 3 in the event of the flow detection device 4 being blocked or faulty.

In the operation described with reference to the drawing, the upstream pressure Pam, which is a reference pressure value, and which may be variable if the upstream pressure varies, could be replaced by another reference pressure such that, for example, a fixed pressure value or the value of the downstream pressure measured by the downstream pressure sensor 7 immediately after each closure of the solenoid valve, and memorized, without modifying the operation described. In this case, the upstream pressure sensor 6 may be removed.

The invention claimed is:

1. A method for detecting and controlling the flow of liquid in a consuming installation, wherein the consuming installation comprises at least one opening/closing means for supplying liquid, the installation being supplied via an inlet pipe fitted with a solenoid valve, a pressure sensor upstream of the solenoid valve that is able to issue an upstream pressure signal (Pam) and a pressure sensor downstream of the solenoid valve that is able to issue a downstream pressure signal (Pav), the method comprising:

calculating the difference ($\Delta P$) between the value of the upstream pressure signal (Pam) and the value of the downstream pressure signal (Pav);

comparing the difference ($\Delta P$) with one opening triggering threshold (S$\Delta$Po); and one closing triggering threshold (S$\Delta$Pf), the value of the opening trigger threshold (S$\Delta$Po) being greater than the value of the closing triggering threshold (S$\Delta$Pf);

when the solenoid valve is closed and the pressure difference ($\Delta P$) reaches or exceeds the opening triggering threshold (S$\Delta$Po), generating an opening command signal (Co) and opening the solenoid valve, when the solenoid valve is opened and the pressure difference ($\Delta P$) reaches or falls below the closing triggering threshold (S$\Delta$Pf), generating a closing command signal (Cf) and closing the solenoid valve, measuring duration values (Dn) for each time period between the closing command signal (Cf) and the opening command signal (Co);

memorizing and comparing the duration values (Dn), and if a predetermined number (n) of successive approximately equal duration values (Dn) are detected, then an alarm signal (Sa) is issued.

2. The method as claimed in claim 1, wherein when the opening command signal (Co) is not followed by the closing command signal (Cf) within a predetermined safety time, a safety command signal closing (Cfsec) the solenoid valve is issued.

3. The method as claimed in claim 1, wherein when the pressure difference (ΔP) reaches or exceeds the opening triggering threshold (SΔPo), said command signal (Co) to open the solenoid valve is issued immediately.

4. The method as claimed in claim 1, wherein when the pressure difference (ΔP) reaches or falls below the closing triggering threshold (SΔPf), a signal (Sf) to close the solenoid valve is generated and said command signal (Cf) to induce closing of the solenoid valve is deferred by a predetermined timer delay (Δt) after the closing signal (Sf).

5. The method as claimed in claim 1, wherein the liquid is water.

6. A device for detecting the flow of liquid in a consuming installation, wherein the consuming installation comprises at least an opening/closing means to supply the liquid that is supplied by an input pipe, the device comprising:
- a solenoid valve generating a pressure drop;
- a pressure sensor fitted upstream of the solenoid valve that is configured to issue an upstream pressure signal (Pam);
- a pressure sensor fitted downstream of the solenoid valve that is configured to issue a downstream pressure signal (Pav); and
- management means configured to issue an opening command signal (Co) and a closing command signal (Cf) of the solenoid valve between a closed state and an open state and to compare the difference between the value of the upstream pressure signal (Pam) and the value of the downstream pressure signal (Pav) with respect to one opening trigger threshold (SΔPo) and one closing triggering threshold (SΔPf) in order to induce the command signals to open or close the solenoid valve, and
- wherein duration values (Dn) measuring each time period between the command signal (Cf) for closing the solenoid valve and the command signal (Co) for opening the solenoid valve are memorized and compared, and if a predetermined number (n) of successive approximately equal duration values (Dn) is detected, then an alarm signal (Sa) is issued.

7. The device as claimed in claim 6, wherein the liquid is water.

* * * * *